(12) United States Patent
Aberizk

(10) Patent No.: US 9,511,710 B2
(45) Date of Patent: *Dec. 6, 2016

(54) VEHICLE REGENERATIVE DECELERATION ACTUATOR AND INDICATOR SYSTEM AND METHOD

(71) Applicant: David Aberizk, San Diego, CA (US)

(72) Inventor: David Aberizk, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/642,347

(22) Filed: Mar. 9, 2015

(65) Prior Publication Data

US 2015/0239393 A1    Aug. 27, 2015

Related U.S. Application Data

(63) Continuation of application No. 14/358,415, filed as application No. PCT/US2012/062260 on Oct. 26, (Continued)

(51) Int. Cl.
*B60Q 1/50* (2006.01)
*B60Q 1/44* (2006.01)
(Continued)

(52) U.S. Cl.
CPC . *B60Q 1/44* (2013.01); *B60L 3/12* (2013.01); *B60L 7/10* (2013.01); *B60Q 1/30* (2013.01); (Continued)

(58) Field of Classification Search
CPC .......... G08G 1/161–1/163; B60Q 1/44; B60Q 1/302; B60Q 1/30; B60L 3/12; B60L 7/10; B60L 7/18; B60W 10/08; B60W 20/00; B60W 20/1062; B60W 30/18127; B60W 2520/105; B60W 2540/04; B60W 20/14; B60T 7/10
(Continued)

(56) References Cited

U.S. PATENT DOCUMENTS

| 3,157,854 A | 11/1964 | Riley |
| 4,924,207 A | 5/1990 | Lariscy |

(Continued)

FOREIGN PATENT DOCUMENTS

| DE | 102008055898 | 5/2010 |
| EP | 1160119 | 12/2001 |

(Continued)

OTHER PUBLICATIONS

Gordon-Bloomfield. "Move Over Tesla. There's a Mercedes Gullwing SLS AMG E-Cell Behind You." Green Car Reports, Jun. 22, 2010. http://www.greencarreports.com/news/1046406__move-over-tesla-theres-a-rnercedes-gullwing-sls-amg-e-cell-behind-you, 3 pages.

(Continued)

*Primary Examiner* — Thomas Mullen
(74) *Attorney, Agent, or Firm* — Procopio, Cory, Hargreaves & Savitch, LLP

(57) ABSTRACT

An indicator system for regenerative slowing of a hybrid or electric vehicle includes at least one regenerative-only deceleration indicator positioned on the rear of a vehicle in addition to the conventional vehicle brake lights, a vehicle deceleration monitor configured to monitor deceleration of the vehicle and produce a control output signal if deceleration exceeds a predetermined level, a vehicle braking module configured to detect application of the conventional vehicle brakes, and an indicator control module configured to actuate the regen-only deceleration indicator when a vehicle deceleration output signal exceeding the predetermined level is received and the conventional vehicle brakes are not applied. An independent driver-operated regen mode switch may provide for driver-initiated regen slowing independent of the conventional vehicle brakes or gears, with the regen-only deceleration indicator being on when regen mode (Continued)

is initiated by the driver without application of the friction brakes, and the predetermined deceleration level is exceeded.

6 Claims, 7 Drawing Sheets

Related U.S. Application Data 2012, now Pat. No. 9,013,292, which is a continuation of application No. 13/310,992, filed on Dec. 5, 2011, now Pat. No. 8,587,424.

(51) Int. Cl.

| | | |
|---|---|---|
| *B60Q 1/30* | (2006.01) | |
| *B60W 10/08* | (2006.01) | |
| *B60W 30/18* | (2012.01) | |
| *B60L 3/12* | (2006.01) | |
| *B60L 7/10* | (2006.01) | |
| *B60T 7/10* | (2006.01) | |

(52) U.S. Cl.
CPC .............. *B60Q 1/302* (2013.01); *B60T 7/10* (2013.01); *B60W 10/08* (2013.01); *B60W 20/14* (2016.01); *B60W 30/18127* (2013.01); *B60W 2520/105* (2013.01); *B60W 2540/04* (2013.01)

(58) Field of Classification Search
USPC ............... 340/467; 701/22, 70, 99; 180/65.1
See application file for complete search history.

(56) References Cited

U.S. PATENT DOCUMENTS

| | | | |
|---|---|---|---|
| 4,983,953 A | 1/1991 | Page | |
| 5,663,706 A | 9/1997 | Francis | |
| 5,682,137 A | 10/1997 | Li | |
| 6,719,076 B1* | 4/2004 | Tabata | B60K 31/00 180/65.7 |
| 7,672,770 B2 | 3/2010 | Inoue et al. | |
| 8,587,424 B2* | 11/2013 | Aberizk | B60Q 1/302 340/467 |
| 9,013,292 B2* | 4/2015 | Aberizk | B60Q 1/302 340/467 |
| 2003/0030554 A1 | 2/2003 | Yavitz | |
| 2004/0164612 A1* | 8/2004 | Worrel | B60L 7/26 303/177 |
| 2010/0250083 A1* | 9/2010 | Takahashi | B60T 8/1755 701/70 |

FOREIGN PATENT DOCUMENTS

| | | |
|---|---|---|
| JP | 7117558 | 5/1995 |
| JP | 07-009002 | 2/2005 |
| JP | 20050096723 | 4/2005 |
| KR | 100986321 | 10/2010 |

OTHER PUBLICATIONS

Niedermeyer. "Pre-Production Review: Volkswagen Golf blue-e-motion." The Truth About Cars, Jul. 19, 2011. http://www.thetruthaboutcars.com/2011/07/pre-production-review-volkswagen-golf-blue-e-motion/ 3 pages.
Fisker Automative, Inc. website, "2012 Fisker Karma Technology", Fisker Automotive, Inc., 2011, http://www.fiskerautomotive.com/en-us/karma/features/technology, 1 page.
Kanolan. University of Michigan, Solarcar Archives, "Most underappreciated solar car piece?" Mar. 17, 2011, http://solarcar.engin.umich.edu/2011/03/the-most-underappreciated-piece-of-solar-car/ 3 pages.
Le Sueur. "Drive by Wire!" Global Solar Challenge 2011, Oct. 5, 2011. http://www.sunswift.com/2011/10/05/drive-by-wire/ 2 pages.
Fradella. Environment, Energy, and Electric Vehicles. "Regenerative Power and Motion" Oct. 2011, http://rpm2.8k.com/humpwr.htm, 8 pages.
Balfour et al. "Deceleration-X Systems: Automobile Deceleration Indication System—Design Specifications." Mar. 15, 1999, http://www.ensc.sfu.ca/~whitmore/courses/ensc305/projects/.../dxdesi.pdf 33 pages.
Wong. "Deceleration-X Systems: Project Proposal for the Automobile Deceleration Indication System." Jan. 18, 1999, http://www.ensc.sfu.ca/~whitmore/courses/ensc305/projects/.../dxprop.pdf 17 pages.
Notification, International Search Report and Written Opinion dated Feb. 26, 2013 for PCT/US2012/62260.

\* cited by examiner

VEHICLE REGENERATIVE DECELERATION ACTUATOR AND INDICATOR SYSTEM AND METHOD

CROSS-REFERENCE TO RELATED APPLICATIONS

This is a continuation of U.S. patent application Ser. No. 14/358,415 filed on May 15, 2014, now U.S. Pat. No. 9,013,292, which is a National Stage entry of PCT/US2012/062260 filed on Oct. 26, 2012 which is a continuation of U.S. patent application Ser. No. 13/310,992 filed on Dec. 5, 2011, now U.S. Pat. No. 8,587,424. The contents of each of the aforementioned applications are incorporated herein by reference.

BACKGROUND

1. Field of the Invention

The present invention generally relates to electric and hybrid vehicles with a regeneration mode, and is particularly concerned with a regeneration mode actuator and indicator system and method for such vehicles.

2. Related Art

Various braking systems and indicators for such systems are known for various types of vehicle, including traditional gas driven vehicles, hybrid vehicles, and electric vehicles. One problem with existing brake lights is that they are only turned on when the driver applies conventional friction brakes. They are not activated when the vehicle slows down for some other reason.

An electric or hybrid vehicle automatically switches into a regeneration mode periodically as controlled by the electronic control unit (ECU) based on detected vehicle conditions, but the driver can also initiate regeneration either by applying the brakes or shifting the vehicle into low gear. Drivers of electric or hybrid vehicles sometimes shift the vehicle into low gear to slow the vehicle while increasing efficiency by delivering power to the storage battery of the vehicle. However, a driver following a conventional hybrid or electric vehicle which is operating in regenerative mode without conventional brake application has no indication that the vehicle is decelerating.

Some prior vehicle indicators are designed to be actuated on detection of slowing of a vehicle resulting from either traditional friction braking or other types of deceleration, for example due to gear shifting. However, these systems do not discriminate between slowing as a result of applying conventional vehicle brakes and slowing for other reasons, for example as a result of initiation of the regeneration mode in a hybrid or electric vehicle.

Electric vehicles are designed to mimic the slowing that occurs in gasoline powered vehicles with an automatic transmission. In electric vehicles, the drive gear slowing sensation (referred to as leakage) and low gear slowing (measured and speed dependent) are exclusively done with the regenerator. In the case of low gear, the regenerator is taken close to saturation or maximum output of the regenerator. An additional slowing, intentional or not, reduces the kinetic recovery potential and thus the overall efficiency of the vehicle.

Driving an electric vehicle in low gear is unofficially stated as an option by manufacturers. The problem with this mode of electric vehicle use is that the efficiency of just coasting above leakage at all times when not accelerating is continuously reduced by the slowing of low gear, and encounters the unnecessary inefficiencies of the kinetic conversion to electric power. Vehicle operators with regenerators are not encouraged to maximize the regeneration feature with modulation of the brake pedal. A brake pedal that utilizes regeneration does so in conjunction with conventional braking. The operator experience is intentionally seamless. That is, the primary consideration is stopping with an expected vehicle slowing feedback to the operator. This offers some kinetic recovery efficiency, but normally involves unnecessary application of conventional frictional brakes.

SUMMARY OF THE INVENTION

Embodiments described herein provide for an independent driver-operated actuator for initiation of the regeneration mode in an electric or hybrid vehicle, as well as an indicator separate from the conventional brake lights which is actuated on detection of regenerative-only (regen-only) slowing or deceleration of the vehicle.

In one aspect, an indicator system for regenerative slowing of a hybrid or electric vehicle is provided, which comprises at least one regen-only slowing indicator positioned at a location below the high center brake light on the rear of a vehicle in addition to the conventional vehicle brake light set, a vehicle deceleration module configured to monitor deceleration of the vehicle and provide a deceleration output signal, a vehicle braking module configured to detect application of the conventional vehicle brakes, and an indicator control module connected to the deceleration module and braking module and configured to actuate the regen-only slowing indicator when the vehicle deceleration exceeds a predetermined value above coasting and the conventional vehicle brakes are not applied. In one embodiment, the indicator control module also monitors the regeneration status of the vehicle and actuates the regen-only slowing indicator only if the vehicle is in the regeneration mode, the predetermined deceleration value is exceeded, and the conventional or friction brakes are not applied.

According to another aspect, an independent, hand-operated regen mode actuator such as push button or rotary switch is provided at a convenient position in the vehicle and is linked to the existing vehicle electronic control unit (ECU) to initiate regenerative slowing when actuated by an operator of the vehicle. This regen mode switch may also provide a signal to the indicator control module to initiate deceleration monitoring by the deceleration module and illumination of the regen-only slowing indicator light when the vehicle deceleration exceeds the predetermined value without application of the conventional vehicle brakes. In this way, drivers following the vehicle can determine that notable deceleration is occurring without application of the conventional friction brakes. The regen-only slowing indicator is extinguished upon normal braking, after which only the conventional brake lights are illuminated. The regen-only slowing indicator may also be turned off automatically after a predetermined time interval, and is turned on again if the regen indicator control conditions are still in effect, i.e. if deceleration still exceeds the predetermined amount while the vehicle is in a regeneration mode and the conventional brakes are not applied.

The driver-operated, independent regen mode switch may be provided on the steering wheel, the dashboard, the gear lever, or at any other convenient location. This provides a convenient, independent control switch, allowing the driver to utilize the operational efficiency of a regenerator in an electric or hybrid vehicle without having to either engage a low gear or press the brake pedal.

One or more deceleration indicator lights may be provided on the rear of the vehicle, and in one embodiment an array of two or more lights for indicating regen-only deceleration may be provided below the third brake light on a vehicle. The deceleration indicator lights are always off when the brake lights are illuminated. In one embodiment, the third brake light and regen-only slowing indicator may be provided in a single unit mounted at an appropriate height in the rear center of the vehicle.

According to another aspect, a method of indicating slowing of an electric or hybrid vehicle without application of conventional brakes is provided, which comprises detection of deceleration of the vehicle exceeding a predetermined level when the vehicle is operating in a regeneration mode, determining whether the conventional brakes have been applied, actuating a deceleration indicator separate from conventional vehicle brake lights only if the predetermined deceleration level is exceeded without application of the conventional vehicle brakes, and turning off the deceleration indicator if the conventional brakes are applied.

In one embodiment, the deceleration indicator may also be turned off on expiry of a predetermined time interval, and is turned on again only if the predetermined conditions of deceleration exceeding the predetermined level without application of the conventional brakes while in the regeneration mode are still present.

This system and method provides enhanced safety by adding a brake-like indicator of vehicle slowing as a result of so-called regenerative braking in an electric or hybrid vehicle which is only actuated when the conventional brake lights are not lit. The system may also include an independent regeneration control input for operation by the driver to initiate regenerative slowing independent from operation of the vehicle brake and gears.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for a vehicle regenerative deceleration indicator system and method which may also incorporate a regenerative braking control button or actuator for convenient operator control of the regenerative mode of operation of an electric or hybrid vehicle.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

Figure 1:
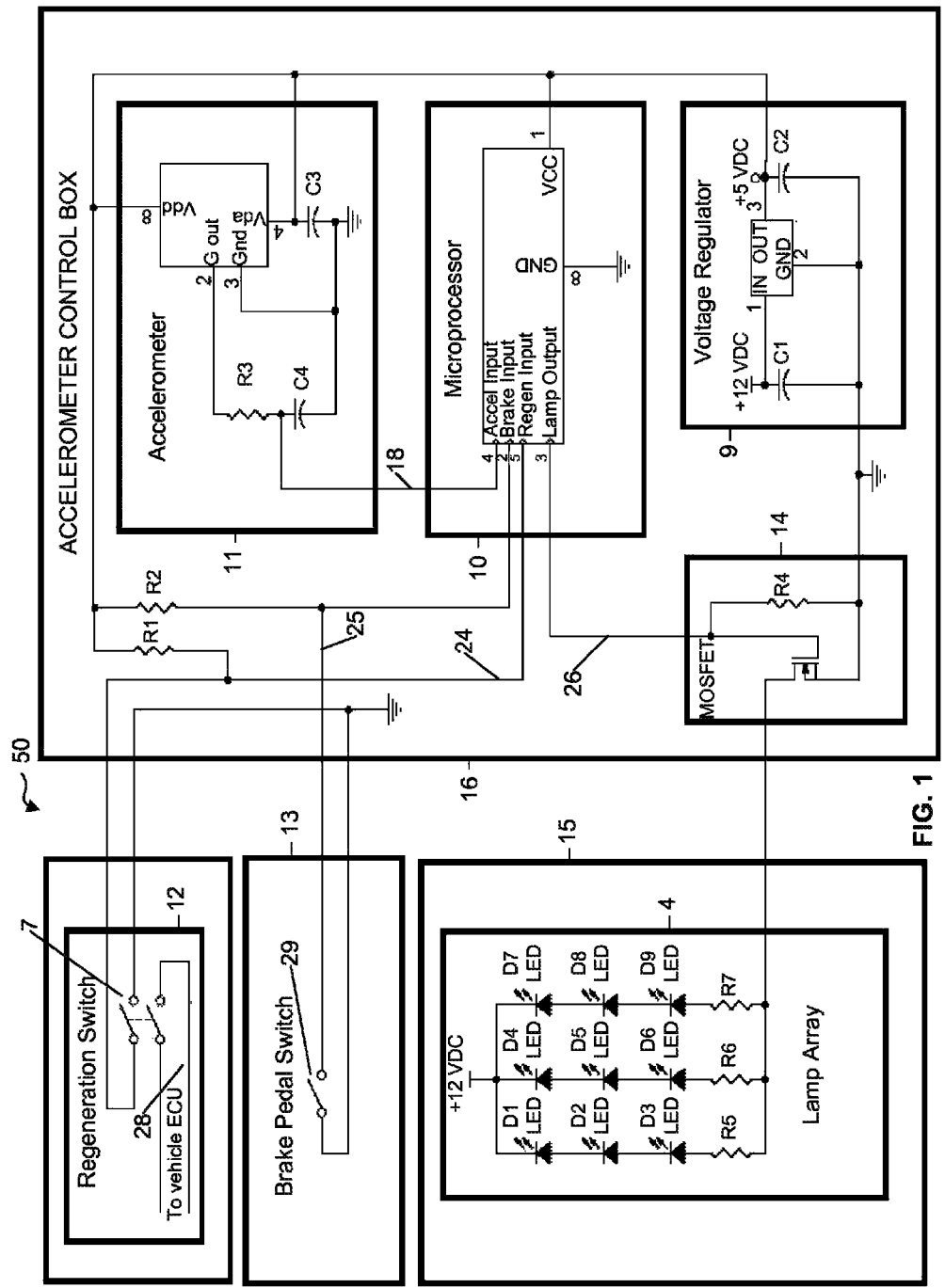
FIG. 1 is a schematic diagram illustrating one embodiment of a vehicle regenerative deceleration actuator and indicator system which controls actuation of a regenerative braking indicator.
Figure 2:
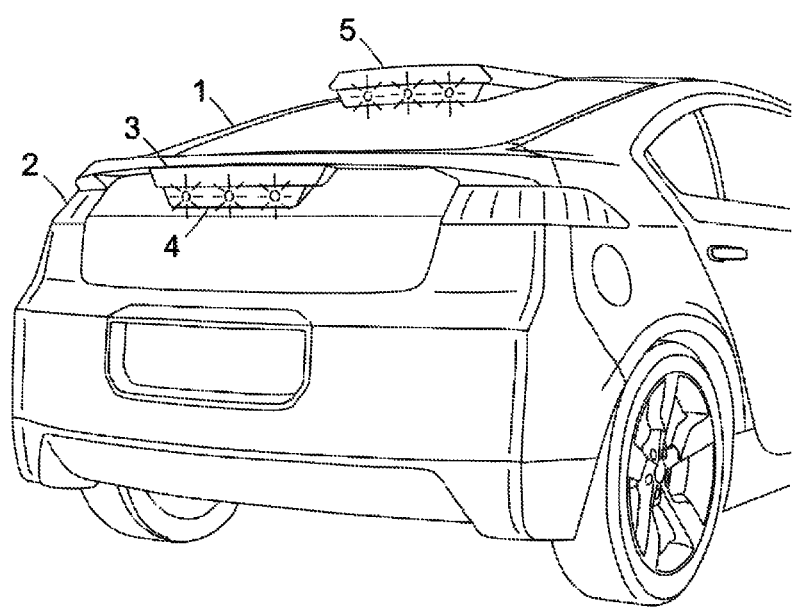
FIG. 2 is a perspective view of the rear of a vehicle illustrating one embodiment of the vehicle regenerative braking or deceleration indicator of FIG. 1.
Figure 3:
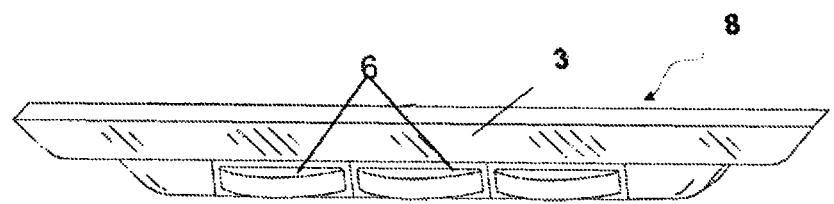
FIG. 3 is a front elevation view illustrating the regenerative braking indicator light array of FIG. 1 combined with an adjacent third brake light.
Figure 4:
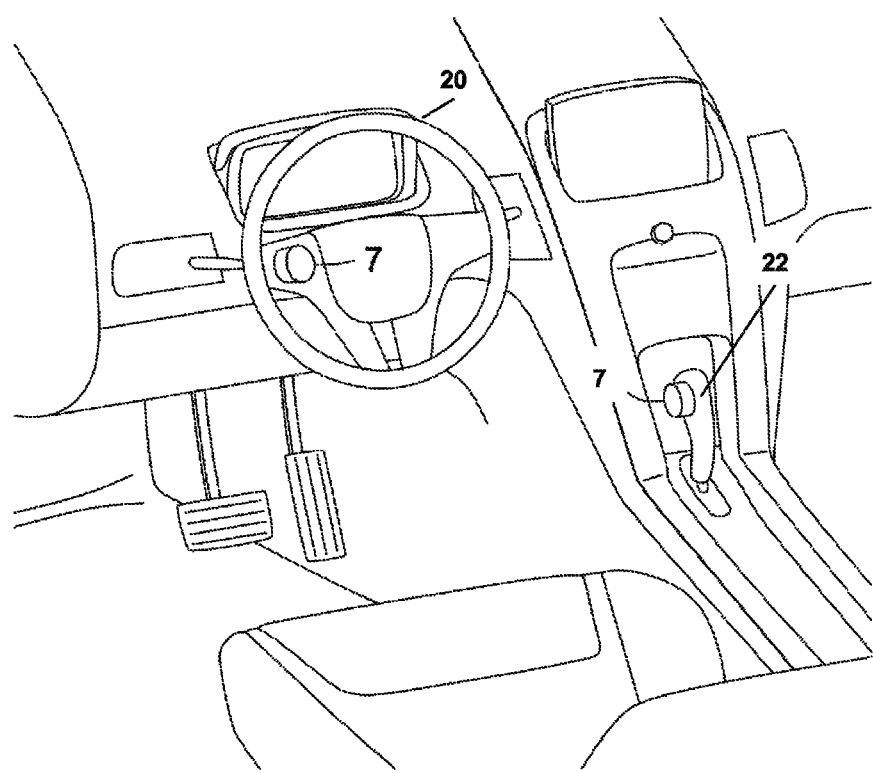
FIG. 4 is a perspective view of the driver console inside a vehicle indicating options for placement of the driver-operated, independent regeneration mode actuator switch of FIG. 1.
Figure 5:
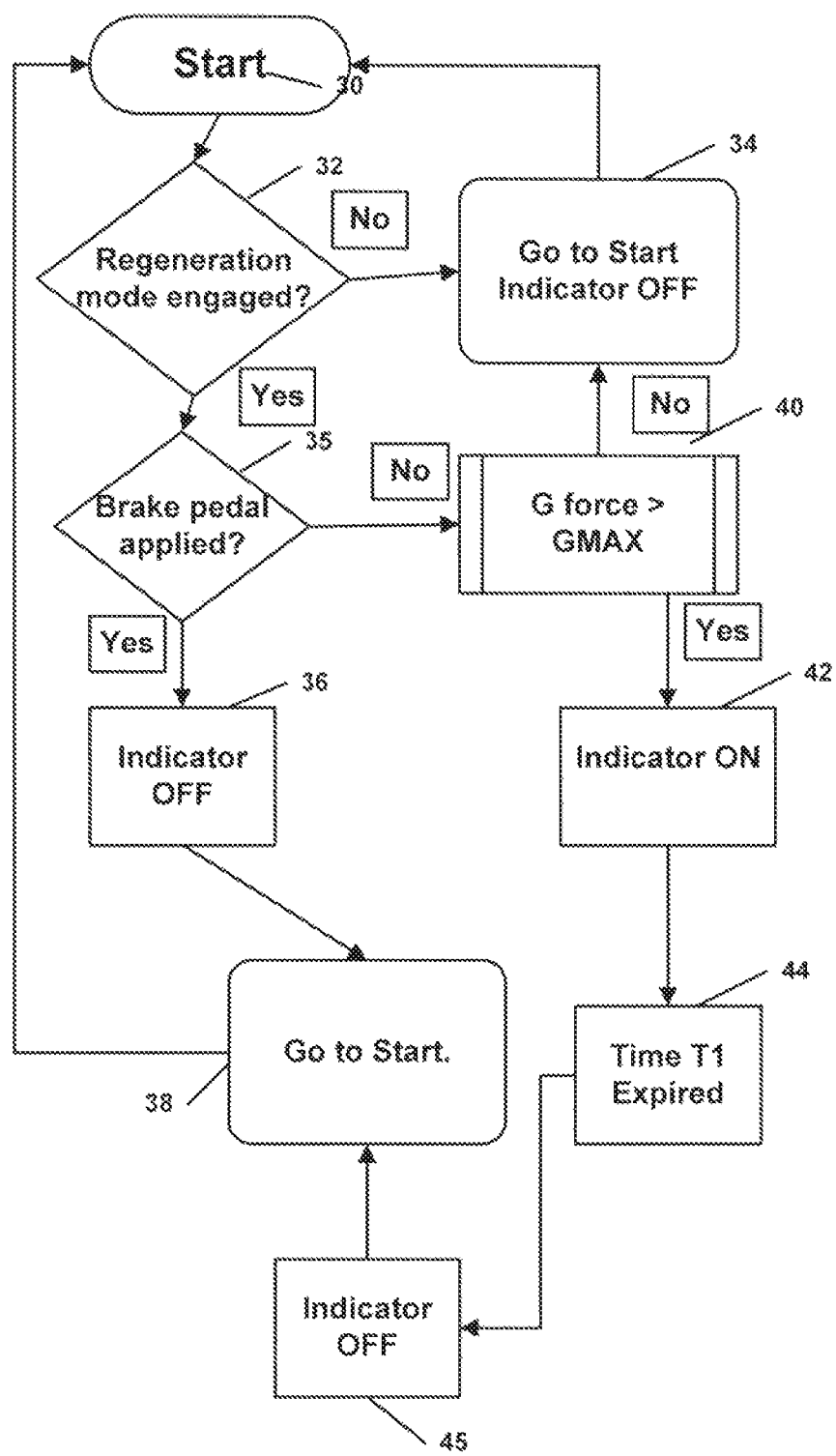
FIG. 5 is a flow diagram illustrating the steps in one embodiment of a method for controlling actuation of the regenerative deceleration indicator in the system of FIGS. 1 to 4.

FIG. 1 illustrates a first embodiment of a vehicle regenerative deceleration or braking indicator system 50 in which an additional regen slowing or deceleration indicator or light 4 at the rear of an electric or hybrid vehicle 1 is controlled to turn on when vehicle deceleration above a predetermined level is detected without application of conventional friction brakes, while FIG. 5 is a flow diagram illustrating the method steps carried out by the system of FIG. 1. FIGS. 2 and 3 illustrate possible locations for deceleration indicator light or light array 4, while FIG. 4 illustrates possible locations in a vehicle for an independent, driver-operated regenerative control switch 7.

In the embodiment of FIGS. 1 to 5, indicator 4 is turned on if the vehicle is in the regenerative mode of operation, a predetermined deceleration level is detected, and the conventional brakes are not applied, i.e. the conventional brake light set 2 and 3, specifically side brake lights 2 and the third brake light 3, are off. The regen-only deceleration or slowing indicator 4 may be mounted directly below third brake light 3 as illustrated in FIG. 2. In one embodiment, the regenerative or "regen" deceleration indicator comprises an array of three indicator lights 6 mounted below the conventional third brake light 3 in a combined light assembly or unit 8, as illustrated in FIG. 3. The third brake light 3 now required by U.S. automotive safety standards is typically located on the centerline and above the brake lights 2. Due to the variability of automotive styling between manufacturers, an alternate location 5 of the third brake light 3 and regeneration light 4 combination is also shown in FIG. 2.

In one embodiment, regenerative braking indicator light 4 comprises multiple elements that are equal red and orange in color and reside in an array below the center high "third brake light," offering a distinct off red color different from the conventional red brake light 3 located above light 4, with an illumination value equal to the "third brake light." In one embodiment, the light or lamp array 4 comprises a plurality of LEDs in a series/parallel configuration, as illustrated in FIG. 1.

In one embodiment, a regeneration mode actuator switch or control button 7 is located on the steering wheel 20 or on the gear shift handle 22, as illustrated in FIG. 4, or may be located at some other convenient location such as on the dashboard or driver control panel, for operation by the driver in order to engage regeneration. Alternatively, two switches or buttons 7 may be provided at different locations. Currently, a vehicle operator of a hybrid or electric vehicle can only initiate regeneration by pressing the brake pedal or engaging electric low gear. Independent operator engagement of regenerative braking can increase vehicle efficiency, and an independently accessible control switch for initiating regeneration in order to slow the vehicle makes such efficiency improvements more readily accessible.

As noted above, FIG. 1 illustrates a control circuit or system 50 for controlling actuation of the regenerative deceleration indicator light or lamp array 4, while FIG. 5 is a flow diagram illustrating a method of operation of the system of FIG. 1 to control actuation of deceleration indicator light or lamp array 4 of FIGS. 2 and 3. The method of FIG. 5 is carried out by controller or microprocessor 10 of FIG. 3 based on output signals from regeneration module 12, brake pedal switch or detector 13, and deceleration detection module or accelerometer 11.

The control electronics circuit of FIG. 1 includes microprocessor 10, deceleration detection module or accelerometer 11 having an output 18 connected to a first input of microprocessor 10, regeneration module 12 having an output 24 connected to a second input of microprocessor 10, and brake pedal detection module or switch 13 having an output 25 connected to a third input of microprocessor 10. Microprocessor 10 has an output 26 connected to deceleration indicator module 15 including deceleration indicator 4 via power MOSFET 14, which is rated to the current and voltage requirements of the deceleration indicator or lamp array 4. A voltage regulator 9 of sufficient electrical current carrying capacity to reduce the vehicle battery voltage to the operating level of the electronic components is connected between the vehicle battery and the power input VCC of microprocessor 10.

The core of the circuit is a microprocessor 10 with a minimum requirement of two digital inputs, one analog input with analog to digital converter with a resolution of at least ten bits, and one digital output. The microprocessor is programmed by software, hardware, or both hardware and software to execute the control method of FIG. 5, as described in more detail below. In one embodiment, the deceleration detection module comprises a solid state MEMS accelerometer 11 designed to sense up to 1 G with analog output 18 connected to the microprocessor analog input via a low pass filter so as to match the input range of the microprocessor. The accelerometer 11, microprocessor 10, voltage regulator 9, and MOSFET 14 may all be provided in one control unit or box 16 mounted at a suitable location in the vehicle and connected via wiring as indicated in FIG. 3 to the regeneration switch module 12, the brake pedal detection or switch module 13, and the deceleration indicator module 15 or deceleration light assembly 4.

The regeneration module is responsive to operator closing of control button or switch 7 to provide output 24 connected to the second microprocessor input, and an output 28 connected to the vehicle electronic control unit (ECU) for initiation of the regeneration mode. In one embodiment, driver-operated control switch 7 is a double pole, single throw switch as illustrated in FIG. 1, but other switches may be used in alternative embodiments.

Brake pedal detection module 13 comprises a brake pedal switch 29 positioned to detect application of the vehicle's conventional friction brakes, for example by detecting depression of the brake pedal, but any suitable device for detecting conventional brake actuation may be provided in alternative embodiments.

In one embodiment, deceleration indicator module 15 comprises a plurality of light emitting diodes in series/parallel configuration and located in the vehicle rear indicator deceleration light assembly 4 of FIGS. 2 and 3. In this embodiment, the light array 4 comprises three sets of three diodes connected in series (D1, D2, D3; D4, D5, D6; and D7, D8, D9) and the three sets of diodes are connected in parallel.

As noted above, FIG. 5 illustrates the program steps carried out by microprocessor 10 based on inputs from the various detector modules. Upon program initiation or start 30, the microprocessor has a default condition in which the regen deceleration indicator 4 is OFF. The program polls the driver-operated regeneration mode actuator switch 7 for a qualifying state (step 32). If initiation of regeneration mode via switch 7 is not detected, the program returns to start/indicator off (34). If a regeneration state is detected, the program polls the status of the brake light or brake pedal switch 29 in step 35. If the brake pedal switch is closed, i.e. the brake light is ON, then regen deceleration indicator 4 remains OFF (36) and the program returns to start (38). If the brake light set 2 and 3 are not on, which is the qualified state, the accelerometer is queried in step 40. The qualifying state of the accelerometer 11 is a reading greater than a predetermined G force or $G_{MAX}$. If less than the qualifying force, the regeneration light or lamp assembly remains OFF and the program returns to the start (34). Once the threshold is reached, the indicator is switched ON (step 42). The regeneration light assembly or indicator 4 remains on for a predetermined time period T1. After expiry of the predetermined time period (44), the deceleration indicator is turned OFF (45) and the system recycles back to the start (step 38).

The system recycles through the steps of FIG. 5 and continues to poll the state of the inputs, turning the regen deceleration indicator ON again if all qualifying conditions are met. If a disqualifying state is detected, for example either a return to the non-regeneration mode of the vehicle or application of the brake pedal, the deceleration light assembly or indicator 4 is returned to OFF or remains OFF (step 34 or 36). The system recycles and repeats the process until the next qualifying event. The system incorporates a watchdog timer, error correction and safety overrides. In the event of the program inadvertently stopping for a period of 1 second, the program resets, indicator 4 defaults to OFF, and the system returns to normal operation. To prevent erroneous disturbing indications with erratic multiple inputs (4 inputs in 8 seconds) outside of the normal operating envelope, the program goes to a timeout and inhibits the regen deceleration indicator or light assembly 4 from returning to ON for a certain time period, for example 20 seconds, then returns to start.

The threshold point for activation of the deceleration indicator 4 in one embodiment was a $G_{MAX}$ of 0.07 G, but different values may be used in other embodiments. The ON period T1 for the regen deceleration indicator or light assembly 4 was six seconds in one embodiment, but may be a longer or shorter time period in other embodiments or for different vehicles. The indicator light 4 therefore flashes on and off while the system is in the qualifying state of detected deceleration of greater than $G_{MAX}$ while the conventional brakes are OFF.

Figure 6:
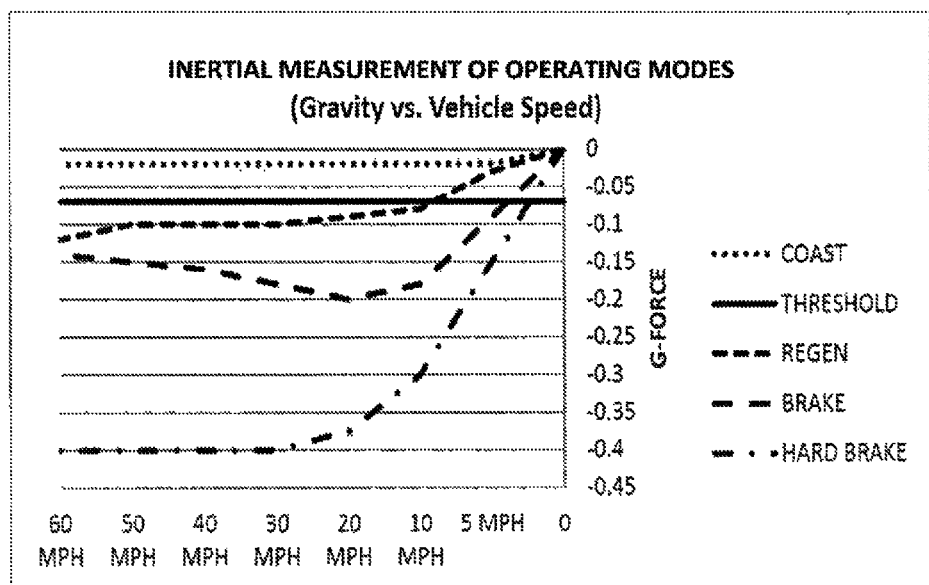
FIG. 6 is a graph illustrating gravity or g-force versus vehicle speed in various deceleration modes.

The selected threshold point $G_{MAX}$ of 0.07 G in the above embodiment was determined through experimentation, and the results are depicted in the graph of FIG. 6. An electric vehicle was equipped with an accelerometer identical to accelerometer 11 of FIG. 1 and a recording device, and was driven through a test area of representative road conditions. The graph is a summary display of the G forces measured during various operating modes and speeds, specifically while coasting, while in regenerative operation mode, with application of the conventional friction brakes, and under hard braking conditions using conventional brakes. The testing was conducted to determine the threshold point where efficiency can be gained based upon recorded conditions of a vehicle equipped with a regenerator. The dotted line (COAST) in FIG. 6 illustrates typical G level while coasting. The measured force while the vehicle was coasting was consistently 0.02 G at all speeds above 5 MPH. Regenerative braking was measured through a series of progressive speeds simulating average driving conditions. The force measured was between 0.08 G at 10 MPH to 0.12 G at 60 MPH with an average measurement of 0.1 G. Conventional friction braking was also measured through a series of progressive speeds simulating average driving conditions. The force measured was between 0.15 G and 0.20 G when the brakes were applied and the brake lights were illuminated. The vehicle was put through a hard brake maneuver to define the limits of the braking force to determine the measurement range. Maximum braking force did not exceed 0.4 G above 30 MPH. The force measured gradually reduced to 0 below 10 MPH. The conclusion of the testing resulted in selection of an optimal threshold point to illuminate the indicator, specifically around 0.07 G, corresponding to a deceleration level above coasting, as illustrated by the solid horizontal line in FIG. 6.

In the foregoing embodiment, the regenerative braking or deceleration indicator 4 is a regeneration-only indicator, since it is only ON when the vehicle slows as a result of regenerative braking without application of conventional brakes. The regeneration-only indicator lights at the rear of the vehicle are turned ON only when a deceleration above $G_{MAX}$ is detected when the vehicle is in a regen mode and the conventional vehicle brakes are not applied. The braking indicator or light array 4 may be controlled to flash on and off, as described above, or may stay on until the regenerative braking conditions are no longer detected in alternative embodiments. The above embodiment is designed for a vehicle which has a convenient, driver-operated regenerative mode control switch 7 for actuation by the driver or operator.

Figure 7:
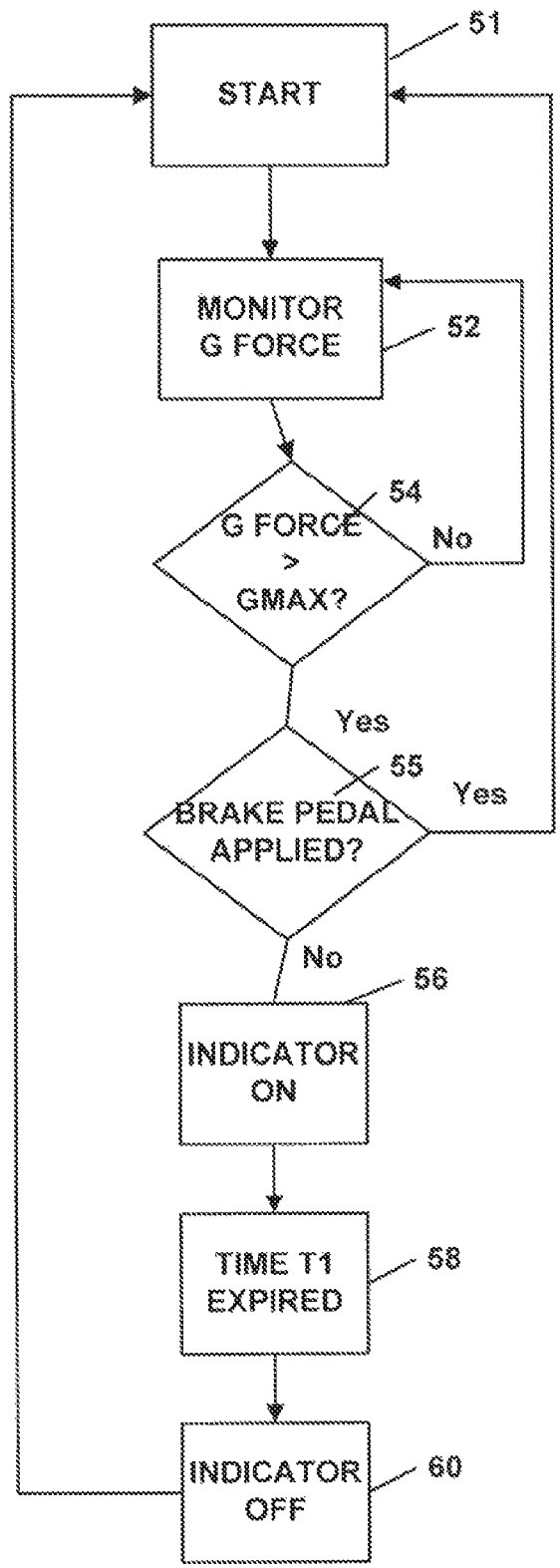
FIG. 7 is a flow diagram illustrating an alternative method for controlling actuation of the regenerative braking or deceleration indicator of FIGS. 2 and 3.

In an alternative embodiment, regenerative braking may be detected simply by detection of a deceleration above a predetermined G force or $G_{MAX}$ without detection of application of the conventional vehicle brakes, for example as illustrated in the flow diagram of FIG. 7. This alternative embodiment may be used for an electric or hybrid vehicle which has a driver-operated regen mode switch or control button 7, or for a vehicle which does not have such a switch 7 and only allows operator initiation of regen mode by engaging a lower gear or by pressing the brake pedal.

In the embodiment of FIG. 7, the output 24 from regeneration detection module 12 to the microprocessor 10 in FIG. 1 is eliminated, and the only control inputs to the microprocessor are the output 25 from brake pedal switch 29 and the output of deceleration detection module or accelerometer 11. The system is otherwise identical to that of FIG. 1. The separate regeneration switch 7 and module 12 of FIG. 1 may be eliminated altogether in an alternative embodiment.

In this system, after startup of the engine (step 51), the detected G-force output of accelerometer 11 is monitored (step 52). If the detected G force is less than $G_{MAX}$ at step 54, the system returns to monitoring the accelerometer. If a G force of greater than $G_{MAX}$ (which may be 0.07 G as in the previous embodiment) is detected, the brake pedal switch is monitored (step 55), and if the conventional brake pedal is applied and brake light 3 is on, the system returns to start (step 50) and the monitoring continues. If no application of the conventional brake pedal is detected at step 55, the deceleration indicator or light assembly 4 is turned ON (step 56), and remains on until time T1 expires (step 58), after which the light assembly 4 is turned OFF (step 60). The system returns to the start position and the monitoring process described above repeats.

The deceleration detector in the above embodiments comprises an electronic inertial vehicle change of velocity detection device or accelerometer. In one embodiment, the accelerometer is a solid state device that has 0.01 G sensitivity, offers resilience to unwanted vibration, and is not susceptible to mechanical deterioration. The solid state accelerometer offers a greater degree of sensing precision that is independent of roadway/engine off axis vibrations and deterioration of a mechanical measuring mechanism.

The regeneration-only actuation method provided by the manual (operator button) input 7 to engage the regenerator, as described above, allows for more efficient use of the vehicle's regenerator by adding an independent access circuit and device for the vehicle operator to easily engage the energy recovery mechanism (regenerator) as a slowing device. This new vehicle driving device is at the operator's disposal for slowing the vehicle without using conventional braking. An operator that becomes familiar with the new regeneration actuator or control button can modify their driving pattern to increase vehicle operating efficiency, and may quickly learn the regenerative slowing capability of the vehicle, and intuitively develop an understanding of how to safely recover momentum while converting kinetic energy to electrical energy. This may extend the range of an all-electric driven vehicle. A driver may learn how to use the regeneration only mode switch to capture energy relatively easily, and can adjust their driving style accordingly. The vehicle operator can choose whether or not to use the new regeneration mode control button to initiate energy savings and safely operate the vehicle, while motorists following the vehicle are alerted to the regen-only slowing condition. If the new driver-operated control switch is inadvertently used, motorists following the vehicle still receive an indication of slowing, and the slowing does not compromise operator control.

The control system in the above embodiments uses an accelerometer with programmed reviews of inertial measurements and brake status to qualify and turn on the regeneration-only deceleration indicator light, and also controls the illumination time as well as inhibiting unwanted activations.

The safety logic that prevailed with the advent of the "third brake light" is the same logic used here, to insure that motorists are aware as soon as possible when the vehicle is decelerating. Operation of the regeneration-only slowing indicator is based on a decision matrix that takes several vehicle operational factors into consideration to determine that a notable deceleration event is in progress that is not the result of conventional friction braking. The regeneration-only deceleration or vehicle slowing indicator 4 illuminates when a deceleration threshold above coasting occurs, which is an event that motorists following the vehicle should be aware of. The regeneration-only indicator is turned off when the vehicle brakes are applied, and it is easy for motorists to distinguish between regenerative and conventional braking conditions. The regeneration only indicator is intuitively interpreted by motorist as some sort of speed reduction indication due to the location below the third brake light with illumination intensity equal to that of the brake lights. The regenerative slowing indicator 4 is off when the brakes are on so that there is no confusion with the familiar brake light, and what that light implies.

Currently, there is no indicator at the rear of a hybrid or electric vehicle to notify following vehicles that the vehicle is slowing as a result of regenerative braking. The foregoing embodiments therefore enhance roadway safety with the addition of an indicator separate from the conventional brake lights to indicate a brake-like slowing of a vehicle as a result of switching into regeneration mode. The system described above may be retrofitted easily on any vehicle equipped with a kinetic regenerator that can be independently initiated by the operator for the purpose of efficient power generating as well as slowing of the vehicle.

The embodiments described above allow a significant (empirically measured) efficiency to be leveraged from electric cars and others with regenerators by means of regeneration-only action which is conveniently and independently accessed by an operator controlled regeneration mode control switch 7 as described above, such as a readily accessible on-off button, rotary wheel, or the like mounted on the steering wheel, shift lever, or any other driver-accessible location, or in more than one such location. This allows a simple hand motion to offer operator initiated regeneration-only for roadway slowing while the button is depressed, rather than from operation of the brake pedal or engaging low gear. Conventional brakes can be utilized if increased efficiency is not desired, without a deterioration of operational safety.

Inclusion of an operator initiated regenerator-only slowing as well as a regeneration-only slowing indicator may be provided in electric or hybrid electric vehicles, or in a gasoline engine vehicle where a regenerator is utilized in place of an alternator driven by the gasoline engine. By isolating regenerative slowing from conventional braking with a brake pedal, an operator may simply maximize kinetic regeneration without generating heat from conventional friction braking.

Those of skill will appreciate that the various illustrative logical blocks, modules, circuits, and algorithm steps described in connection with the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A driver-operated vehicle regenerative (regen) deceleration actuator system for an electric or hybrid vehicle, the system comprising:
    driver-operated regeneration mode actuator switch configured for mounting in an electric or hybrid vehicle at a location accessible by the driver, the driver-operated regeneration mode actuator switch having at least one output lead configured for connection to an electronic control unit (ECU) of the electric or hybrid vehicle to initiate regenerative slowing of the electric or hybrid vehicle; and
    an indicator control module connected to the driver-operated regeneration mode actuator switch, and being configured to turn ON a vehicle braking indicator mounted on the rear of the electric or hybrid vehicle on detection of predetermined regen-only conditions, the predetermined regen-only conditions comprising at least detection of driver initiation of a regeneration mode using the driver-operated regeneration mode actuator switch.

2. The system of claim 1, further comprising a vehicle deceleration detection module configured to monitor deceleration of the electric or hybrid vehicle, the vehicle deceleration detection module having an output configured to provide a detected deceleration output signal, the output signal connected to an input of the indicator control module;
  wherein the predetermined regen-only conditions for turning ON the vehicle braking indicator further comprise a detection of a deceleration G-force greater than $G_{MAX}$, where $G_{MAX}$ is a predetermined maximum G-force greater than a coasting G-force of the electric or hybrid vehicle.

3. The system of claim 2, wherein the vehicle deceleration detection module comprises an accelerometer configured to sense deceleration levels up to at least 1 G.

4. The system of claim 3, wherein the accelerometer is a solid state device having at least 0.01 G sensitivity.

5. A method of initiating regenerative (regen-only) slowing of an electric or hybrid vehicle without application of the conventional vehicle friction brakes of the vehicle, comprising:
  monitoring an output of a driver-operated regeneration mode actuator switch located at a driver-accessible position in an electric or hybrid vehicle and having a first output lead connected to a vehicle electronic control unit (ECU) in the electric or hybrid vehicle;
  initiating regenerative slowing of the electric or hybrid vehicle via the ECU when the driver turns ON the driver-operated regeneration mode actuator switch; and
  turning ON a vehicle slowing indicator on the rear of the electric or hybrid vehicle on detection of a regeneration mode condition comprising at least driver operation of the regeneration mode actuator switch.

6. The method of claim 5, further comprising monitoring deceleration of the electric or hybrid vehicle when the electric or hybrid vehicle is operating in a regeneration mode, wherein the regeneration mode condition further comprises detection of a vehicle deceleration which exceeds a predetermined G-force of $G_{MAX}$ which is greater than a vehicle coasting G-force.

* * * * *